United States Patent [19]

Basham et al.

[11] Patent Number: 4,622,683
[45] Date of Patent: Nov. 11, 1986

[54] FAST ACQUISITION RINGING FILTER MSK DEMODULATOR

[75] Inventors: Jack K. Basham, Westchester; Kenton T. T. Ho, Torrance; Eric M. Mrozek, Manhattan Beach, all of Calif.

[73] Assignee: TRW Inc., Redondo Beach, Calif.

[21] Appl. No.: 670,440

[22] Filed: Nov. 8, 1984

[51] Int. Cl.$^4$ ............................................. H04L 27/14
[52] U.S. Cl. ...................................... 375/90; 329/50; 329/112; 375/77
[58] Field of Search ........................ 375/43, 45, 47, 50, 375/77, 86, 88, 90; 455/46, 202; 329/50, 110, 112

[56] References Cited

U.S. PATENT DOCUMENTS 4,338,579 7/1982 Rhodes ............................ 329/112

FOREIGN PATENT DOCUMENTS

0207463 12/1982 Japan ................................ 375/90

Primary Examiner—Marc E. Bookbinder
Attorney, Agent, or Firm—Noel F. Heal

[57] ABSTRACT

A clock and carrier recovery circuit, and a related method, for use in a minimum shift keying (MSK) receiver demodulator. The clock and carrier recovery circuit uses ringing filters to lock onto two frequency-doubled tone components of a received MSK signal. A signal having the same frequency as the clock is recovered by taking the difference of the outputs of the two filters. The output of each filter is then combined separately with a signal having a frequency to produce to signals, each having a frequency equal to twice the carrier frequency and having complementary amplitude modulation. These two signals are summed to cancel the amplitude modulation and the resulting sum signal, having constant amplitude and a frequency twice that of the carrier, is divided by two to recover the carrier signal.

16 Claims, 3 Drawing Figures

FAST ACQUISITION RINGING FILTER MSK DEMODULATOR

BACKGROUND OF THE INVENTION

1. Field of the Invention

The present invention relates generally to digital communications, and more particularly to demodulators for minimum shift keying (MSK) digital communication systems. The following brief explanation of MSK communication systems is by way of background to a discussion of the prior art and the invention.

MSK In General

Digital information is transmitted as a serial stream of discrete bits of information each bit being either a logic "1" or a logic "0". The bits are presented for transmission at a rate called the clock rate or clock frequency $F_k$. $F_k$ is sometimes expressed in terms of the clock period T, where $F_k = 1/T$.

Frequency shift keying (FSK) is a method of encoding and transmitting digital data by radio. In an FSK system, the "0" and "1" bits to be transmitted are converted into two tones, one of the tones having frequency $F_1$ and the other having frequency $F_2$. These two tones are used to frequency modulate a radio frequency ("rf") carrier having frequency $F_c$, and the resulting frequency modulated (FM) signal is then transmitted.

At a receiver, the received FSK signal is demodulated to recover the tones, and then the tones are converted back into digital data.

Minimum shift keying (MSK) is a particularly efficient type of FSK system and hence is preferred for satellite communication systems. In MSK, tone frequencies $F_1$ and $F_2$ are required to relate to $F_c$ and $F_k$ in accordance with the equations:

$$F_1 = F_c - F_k/4 \tag{1}$$

$$F_2 = F_c + F_k/4 \tag{2}$$

MSK Modulation

Data bits are presented to an MSK modulator serially. Each bit has a duration equal to the clock period T. Thus at time 0, the first bit arrives; at time T, the next bit; at time 2T, the next bit; and so on.

The MSK modulator diverts this serial stream of data bits into two parallel channels called the "I" channel and the "Q" channel. The data bits alternate between channels; thus, if the nth bit goes to the I channel, the (n+1)th bit goes to the Q channel.

Because each bit has duration T, but only every other bit is present in the I channel, there is a space of duration T between successive bits in the I channel. The existence of these spaces permits each bit in the I channel to be shaped into a single half-sinusoid of duration 2T, thereby filling in the spaces. The output of the I channel is thus a continuous stream of half-sinusoids, each of duration 2T. Each half-sinusoid is positive if it represents a logic "1" and negative if it represents a "0".

A half-sinusoid of duration 2T corresponds to one-half of a sinusoid having period 4T and frequency $1/(4T) = F_k/4$.

The I channel output therefore corresponds to a continuous sinusoid I(t) having a frequency $F_k/4$. Because successive bits in the I channel are presented at times that are even multiples of T, I(t) is a cosine function defined by the expression:

$$I(t) = i\cos\left(2\pi t \frac{F_k}{4}\right) \tag{3}$$

where $i = +1$ when I(t) is representing a logic "1" and $i = -1$ when I(t) is representing a logic "0".

A similar shaping process is performed on bits in the Q channel. Because successive bits in the Q channel are presented at times that are odd multiples of T, Q(t) is a sine function defined by the expression:

$$Q(t) = q\sin\left(2\pi t \frac{F_k}{4}\right) \tag{4}$$

where $q = +1$ when Q(t) is representing a logic "1" and $q = -1$ when Q(t) is representing a logic "0".

The rf carrier signal is split into two signals, each being a sinusoid having frequency $F_c$. One of these $F_c$ signals is modulated by I(t), resulting in a signal given by the expression:

$$I^*F_c = i\cos\left(2\pi t \frac{F_k}{4}\right)\cos(2\pi t F_c) \tag{4a}$$

The other $F_c$ signal is shifted 90 degrees in phase and then is modulated by Q(t), resulting in the following signal:

$$Q^*F_c = q\sin\left(2\pi t \frac{F_k}{4}\right)\sin(2\pi t F_c) \tag{4b}$$

The final step in the modulation process is to add $I^*F_c$ and $Q^*F_c$ together to produce an MSK output signal S:

$$S = i\cos\left(2\pi t \frac{F_k}{4}\right)\cos(2\pi t F_c) + q\sin\left(2\pi t \frac{F_k}{4}\right)\sin(2\pi t F_c) \tag{4c}$$

The trigonometric identities $$\cos A \cos B - \sin A \sin B = \cos(A+B),$$

and $$\cos A \cos B + \sin A \sin B = \cos(A-B)$$

may be applied to S with the following results:

$$S = \cos\left[2\pi t\left(F_c - \frac{F_k}{4}\right)\right] = \cos 2\pi t F_1 \tag{4d}$$

if $i = +1$ and $q = +1$;

$$S = \cos\left[2\pi t\left(F_c - \frac{F_k}{4}\right)\right] = -\cos 2\pi t F_1 \tag{4e}$$

if $i = -1$ and $q = -1$;

-continued $$S = \cos\left[2\pi t\left(F_c + \frac{F_k}{4}\right)\right] = \cos 2\pi t F_2 \quad (4f)$$

if $i = +1$ and $q = -1$;

$$S = -\cos\left[2\pi t\left(F_c + \frac{F_k}{4}\right)\right] = -\cos 2\pi t F_2 \quad (4g)$$

if $i = -1$ and $q = +1$.

Hence, if i and q have the same sign, then S will have a frequency $F_1 = F_c - F_k/4$, but if i and q have opposite signs then S will have a frequency $F_2 = F_c + F_k/4$. These two values of the frequency of S are equal to the required frequencies for tones $F_1$ and $F_2$ as given by equations (1) and (2).

To summarize the above process, in an MSK modulator an input stream of digital data having a clock period T and clock frequency $F_k$ is divided into two channels designated the I and Q channels. The even-numbered bits go to one-channel, the odd-numbered bits to the other. The bits in each channel are converted into a sinusoidal signal having a frequency of one-fourth the clock frequency. The I and Q channel sinusoidal output signals are 90 degrees out of phase with respect to each other. These I and Q output signals modulate an rf carrier having frequency $F_c$ to produce a final MSK output signal S. The phase of S changes back and forth between 0 and 180 degrees from time to time, and the frequency of S changes back and forth between $F_1 = F_c - F_k/4$ and $F_2 = F_c + F_k/4$ from time to time, according to the values of the data being transmitted. S may therefore be considered as assuming the frequencies $F_1$ and $F_2$ at various times, and each of these frequencies may have a phase of 0 or 180 degrees. The signal S takes only one of these four possible forms at any given moment.

Transmission

A double-sideband suppressed-carrier transmission technique is used for the actual transmission of S. In this technique, the carrier at frequency $F_c$ is suppressed before transmission, and only frequencies $F_1$ and $F_2$ are actually sent. A substitute "carrier" having frequency $F_c$ in phase with the transmitter's carrier must be regenerated in the receiver in order to demodulate S and recover I(t) and Q(t). Also, a clock signal at frequency $F_k = 1/T$ must be regenerated in the receiver in order to convert I(t) and Q(t) back into digital data.

Demodulation

In an MSK receiver, a received MSK signal S is demodulated to extract the I(t) and Q(t) sinusoidal signals. This demodulation process is effected by splitting the signal S into two channels; electronically mixing a regenerated carrier having frequency $F_c$ with S in one of the channels to produce I(t); phase-shifting the regenerated carrier 90 degrees; and then mixing the phase-shifted carrier with S in the other channel to produce Q(t).

I(t) is then combined with a regenerated clock signal to reproduce the I channel data bits, and Q(t) is combined with the same clock signal to reproduce the Q channel data bits. Finally the I and Q channel data bits are recombined to yield a reproduction of the original digital data in serial form.

Circuits to regenerate carrier and clock signals in MSK receivers are known to the art. However, these circuits are not practical for time division multiple access (TDMA) applications, such as modern satellite communication systems, as will become apparent from the following discussion of the prior art. The present invention overcomes this problem and provides a practical MSK demodulator for use in TDMA applications.

The Prior Art

It will be apparent that a regenerated carrier signal having the same frequency $F_c$ as the transmitter carrier, and precisely in phase with it, is needed to successfully demodulate a received MSK signal S. Also, a regenerated clock signal having frequency $F_k = 1/T$ is required in order to recover digital data from the demodulated S signal.

The only frequencies actually received by an MSK receiver are $F_1 = F_c - F_k/4$ and $F_2 = F_c + F_k/4$ as given in equations (1) and (2). These two equations can be solved for $F_c$ and $F_k$ as follows:

$$F_c = (2F_1 + 2F_2)/4 \quad (5)$$

$$F_k = 2F_2 - 2F_1 \quad (6)$$

The operations described by equations (5) and (6) can be carried out by an electronic circuit to regenerate $F_c$ and $F_k$ from $F_1$ and $F_2$. The circuit of FIG. 1, developed by de Buda ("Coherent Demodulation of Frequency-Shift Keying With Low Deviation Ratio", IEEE Trans. Commun., Vol. COM-20, No. 6, June 1972, pages 429–435), can be used for this purpose.

Figure 1:
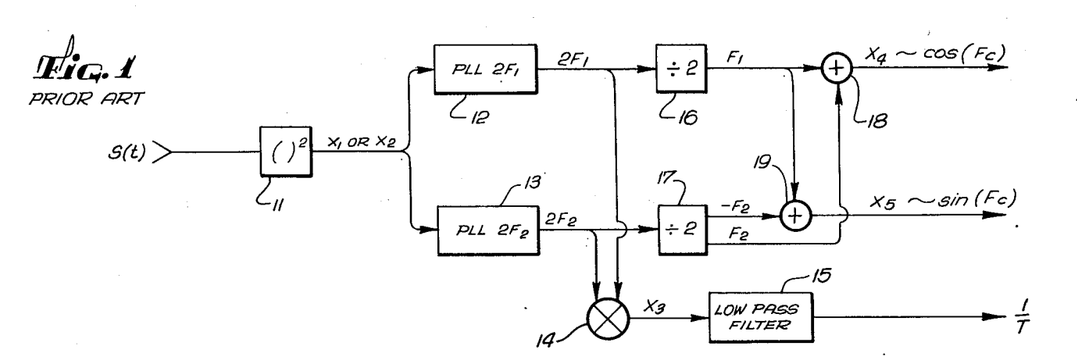
FIG. 1 is a block diagram of a prior art MSK clock and carrier recovery circuit.

In FIG. 1, a received MSK signal S is applied to a squarer 11. Since S is sinusoidal, the effect of squarer 11 is to apply the trigonometric identity $$\cos^2 A = \tfrac{1}{2} + \tfrac{1}{2} \cos 2A \quad (6a)$$

to S, thereby doubling the frequency of S. The resulting signal, at any given moment, is either $$X_1 = \cos[2\pi t (2F_1)] \quad (6b)$$

is S is then being transmitted at frequency $F_1$, or $$X_2 = \cos[2\pi t (2F_2)] \quad (6c)$$

if S is then being transmitted at frequency $F_2$.

$X_1$ and $X_2$ are applied to phase-locked loop ("PLL") 12 and to PLL 13. PLL 12 locks onto $X_1$ during those times when $F_1$ is being transmitted and gives a stable, continuous output signal having frequency $2F_1$. PLL 13 locks onto $X_2$ during those times when $F_2$ is being transmitted and gives a stable, continuous output signal having frequency $2F_2$.

The outputs of PLL 12 and PLL 13 are multiplied in mixer 14, yielding an output $X_3$ composed of the sum and the difference of $2F_1$ and $2F_2$. A low pass filter 15 removes the sum, leaving the difference $2F_2 - 2F_1$ as its output. In accordance with equation (6), this output from filter 15 is the desired clock frequency $F_k$, and recovery of the clock signal is complete at this point in the circuit.

The output of PLL 12 which is a signal having frequency $2F_1$, is reduced to a signal having frequency $F_1$ in divider 16, and the output of PLL 13 is similarly reduced to a signal having frequency $F_2$ in divider 17.

$F_1$ and $F_2$ are added in summing block 18, producing an output signal $X_4$ that contains $$\cos(2\pi t\, F_c) \qquad (6d)$$

in a form usable to demodulate S so as to recover I(t).

Similarly, output signal $X_5$ from summing block 19 contains $$\sin(2\pi t\, F_c) \qquad (6e)$$

in a form usable to demodulate S so as to recover Q(t).

The positive or negative sign in front of S is removed by the squaring operation performed by squarer 11, resulting in a 180 degree phase ambiguity in the recovered carrier signal $F_c$. The undesirable effect of this ambiguity on the output digital data can be compensated for by differentially encoding the digital data prior to transmission and differentially decoding the data after reception, a process known to the art.

The phase-locked loops used in the circuit of FIG. 1 require a long interval of time, as much as several seconds, to lock onto their respective signals. This long lock-on time does not matter provided the duration of the transmission is much longer than the acquisition time. However, in satellite TDMA applications, a ground station transmits a burst of data to a satellite receiver during a time interval measured in microseconds. Then the transmission stops until the next burst of data is ready for transmission. In the meantime, the satellite receiver is reassigned to receive a burst of data from a different ground station; when that burst of data has been transmitted, the receiver is reassigned to yet a third ground station, and so on. A significant problem in TDMA systems arises from the randomness of the clock and carrier phase on a burst-to-burst basis. It will be apparent that a receiver using phase-locked loops does not have enough time to lock onto signals coming from various transmitters when each such signal has a duration measured in microseconds.

Attempts have been made to avoid the long lock-on times characteristic of phase-locked loops by replacing them with narrow bandpass filters. However, unlike a phase-locked loop, a narrow bandpass filter does not produce a constant-amplitude output. Rather, the amplitude of the output of such a filter varies, reaching a maximum level only after the desired input frequency has been continuously present for some interval of time. When the input signal vanishes, the amplitude of the filter output starts to decay.

It will be recalled that the frequency of the MSK signal S changes back and forth between $F_1$ and $F_2$, and that only one of these two frequencies is present at any given time. Therefore, if narrow bandpass filters are used to isolate these two frequencies, the amplitude of the output of each filter will continuously vary as S changes back and forth between $F_1$ and $F_2$. This variation in amplitude of the filter outputs constitutes amplitude modulation (AM) of the filter output signals, and the AM thus introduced must be removed by a limiter circuit before further use can be made of these signals. A limiter prevents the amplitude of a signal from exceeding a specified level, while preserving the shape of the waveform at amplitudes less than the specified level.

Current and future satellite communication systems employ high data rates, which require relatively high intermediate processing frequencies. A significant problem for rapid acquisition systems is the need to provide a recovered carrier with constant power. A significant problem resulting from this need is that limiters at these frequencies, while eliminating amplitude modulation, lead to unacceptable levels of phase modulation. This phase modulation causes significant degradation in the accuracy of the processed data. Hence, there has not been any practical way to take advantage of the highly efficient MSK method of transmission in TDMA applications at such high data rates. The present invention satisfies the need for such a circuit.

SUMMARY OF THE INVENTION

The present invention is characterized by a carrier and clock recovery circuit, and a related method, using filters to produce two signals at frequency $2F_c$. Although each of these signals is amplitude modulated by its respective filter, the modulation patterns are complementary, and thus when the two signals are added together, the result is a constant-amplitude signal at frequency $2F_c$.

Briefly and in general terms, the present invention uses ringing filters rather than phase-locked loops to lock onto the $2F_1$ and $2F_2$ components of the doubled input signal S. These filters acquire their respective input signals without the long time delay characteristic of phase-locked loops. The amplitude modulation (AM) introduced by either filter is at all times equal in magnitude but opposite in polarity to the AM introduced by the other.

The output signal of the $2F_1$ filter may, by using equation (1) be represented as:

$$2F_1 = 2(F_c - F_k/4) = 2F_c - F_k/2$$

In the present invention, this $2F_1$ signal is mixed with a recovered $F_k/2$ signal to yield a sum signal having frequency $$2F_1 + F_k/2 = 2F_c - F_k/2 + F_k/2 = 2F_c.$$

This signal will hereafter be referred to as $2F_c'$.

The output signal of the $2F_2$ filter may, by using equasion (2), be represented as:

$$2F_2 = 2(F_c + F_k/4) = 2F_c + F_k/2$$

In the present invention, this $2F_2$ signal is mixed with a recovered $F_k/2$ signal to yield a difference signal having frequency $$2F_2 - F_k/2 = 2F_c + F_k/2 - F_k/2 = 2F_c.$$

This signal will hereafter be referred to as $2F_c''$.

The $2F_1$ ringing filter impresses on the $2F_1$ signal an AM that varies according to the presence of the $F_1$ tone in S, and the $2F_2$ ringing filter impresses on the $2F_2$ signal an AM that varies according to the presence of the $F_2$ tone in S. But, since either $F_1$ or $F_2$, but not both, is always present in S, the AM of the $2F_2$ signal is complementary to the AM of the $2F_2$ signal. Two signals with complementary AM have the property that the sum of their amplitudes always equals a constant. The AM on the $2F_1$ signal is passed through its mixer onto $2F_c'$, and the AM on the $2F_2$ signal is passed through its mixer onto $2F_c''$. Since the AM on $2F_c'$ is equal and opposite to the AM on $2F_c''$, if the two signals are summed, their respective AM parts cancel each other and the result is a constant-amplitude signal of frequency $2F_c$. A simple frequency divider yields the desired end result, a constant-amplitude signal having frequency $F_c$.

In accordance with the invention, a received MSK signal S is applied to a frequency-doubling circuit such as a squarer. As discussed previously, the result is a signal having components of frequency twice $F_1$ and twice $F_2$. This signal is applied to two ringing filters, one tuned to $2F_1$ and the other tuned to $2F_2$. These ringing filters produce output signals of frequency $2F_1$ and $2F_2$, respectively.

It is necessary to recover the clock frequency $F_k$ as well as the carrier, and this clock recovery is performed by the same means as in the prior art clock recovery circuit. Specifically, the $2F_1$ and $2F_2$ signals are mixed to produce a difference signal of frequency $F_k$. Filtering is used to eliminate spurious mixer output frequencies, and, although AM is present in the recovered clock signal, the frequency $F_k$ is sufficiently low that the AM may be eliminated by using a conventional limiter without introducing unacceptable PM.

The $F_k$ signal is divided by two to produce a signal having frequency $F_k/2$. This signal is mixed with $2F_1$ to produce sum and difference frequencies, but only the sum, having frequency $2F_c$ and referred to as $2F_c'$, is used.

The signal having frequency $F_k/2$ is also mixed with $2F_2$ to produce sum and difference frequencies, but only the difference, having frequency $2F_c$ and referred to as $2F_c''$, is used.

The $2F_c'$ signal carries the AM caused by the $2F_1$ filter, and the $2F_c''$ signal carries the AM caused by the $2F_2$ filter. These two signals are algebraically added in a summing circuit, and the equal and opposite AM component cancel each other, yielding a signal of frequency $2F_c$ and constant amplitude. This signal is filtered and divided by two to produce the final output signal $F_c$. Additional filtering of the final $F_c$ signal may be performed as needed.

Although the carrier and clock recovery technique of the present invention will work at many frequencies, it has particular value at frequencies where other circuits with limiters present unacceptable phase modulation. At these high frequencies, power dividers must be used at each point in the circuit where the signal is divided into two paths. Also, depending on the frequency and signal strength of the received signal and on whether the signal is preamplified prior to the clock and carrier recovery operation, amplifiers may be needed at various points in the recovery circuit, including before and after the squaring operation and after each filtering operation.

It may also be desirable to filter the clock signal as recovered from the first mixer by the combination of a bandpass filter and a low pass filter, with amplification taking place in conjunction with each filtering operation, prior to the limiter stage.

The carrier and clock recovery circuit may be combined with an I-Q demodulator circuit to produce output signals I(t) and Q(t). In such a demodulator, the $F_c$ signal is split by a power divider or other suitable dividing means into two signals. The input signal S is also split into two signals, but one of these signals is phase-shifted 90 degrees. The phase-shifted input signal is mixed with one of the $F_c$ signals to produce Q(t), and the other input signal is mixed with the other $F_c$ signal to produce I(t). After suitable filtering to remove spurious mixer outputs, I(t) and Q(t) are available for decoding.

In terms of a novel method for recovering clock and carrier signals from a received signal containing two frequency tones $F_1$ and $F_2$, the invention comprises the steps of doubling the frequency of the received signal, filtering the frequency-doubled signal in two ringing filters tuned to frequencies $2F_1$ and $2F_2$, respectively, to yield first and second continuous signals at these frequencies, deriving a half-clock-frequency signal from the first and second continuous signals, and mixing the first and second continuous signals with the half-clock-frequency signal, to yield two composite signals containing a component at twice the carrier frequency. The concluding steps needed to recover the carrier are summing the two composite signals to eliminate opposite amplitude modulations, filtering the signal resulting from the summing step, to obtain a signal of constant amplitude and at twice the carrier frequency, and frequency-dividing the latter signal to recover the carrier signal.

In the preferred embodiment of the invention, the step of deriving the half-clock-frequency signal includes mixing the two first and second continuous signals with each other, filtering the signals resulting from the last-mentioned mixing step to obtain a difference component at the clock frequency, limiting the difference component signal to eliminate amplitude variations, and frequency-dividing the clock-frequency signal to obtain the half-clock-frequency signal.

It will be appreciated from the foregoing that the present invention represents a significant advance in the field of digital communications. In particular, the present invention makes possible the transmission of digital data by means of the highly efficient and relatively error-free MSK method at high data rates in a TDMA environment. Other aspects and advantages of the present invention will become apparent from the following more detailed description taken in conjunction with the accompanying drawings.

DESCRIPTION OF THE PREFERRED EMBODIMENT

It has not been possible to use the highly efficient minimum shift keying ("MSK") system for transmitting digital data in time-division multiple-access (TDMA) applications because phase-locked loops in the carrier and clock recovery section of the demodulators of MSK receivers are subject to prolonged phase transients and cannot lock onto tone components of the received signal fast enough. Other available methods of signal acquisition introduce unacceptable phase modulation distortion into the recovered carrier signal.

The present invention solves this problem by using ringing filters for signal acquisition in the carrier and clock recovery section of an MSK demodulator; producing two carrier signals having complementary amplitude modulation; and using a summing circuit to eliminate this amplitude modulation without introducing phase modulation distortion.

FIG. 1 illustrates a typical prior art carrier and clock recovery circuit. An MSK input signal S is applied to squarer 11. Since S is sinusoidal, the effect of squarer 11 is to double the frequency of S. The output of squarer 11 at any given moment has frequency either $X_1 =$ twice $F_1$ or $X_2 =$ twice $F_2$, where $F_1$ and $F_2$ are the two modulating tones, see equations (1) and (2), which produce S.

$X_1$ and $X_2$ are applied to phase-locked loop (PLL) 12 and to PLL 13. PLL 12 locks onto $X_1$ during those times when $F_1$ is being transmitted and gives a stable, continuous output at frequency $2F_1$. PLL 13 locks onto $X_2$ during those times when $F_2$ is being transmitted and gives a stable, continuous output at frequency $2F_2$.

The outputs of PLL 12 and PLL 13 are multiplied in mixer 14, yielding an output $X_3$ composed of the sum and the difference of $2F_1$ and $2F_2$. A low pass filter 15 removes the sum, leaving as its output a signal having a frequency equal to the difference $2F_2 - 2F_1 =$ clock frequency $F_k$.

The output of PLL 12, $2F_1$, is reduced to $F_1$ in divider 16, and $2F_2$ is similarly reduced to $F_2$ in divider 17. $F_1$ and $F_2$ are added in summing block 18 to produce $X_4$, a cosine function of carrier frequency $F_c$, and $F_1$ and $-F_2$ are added in summing block 19 to produce $X_5$, a sine function of $F_c$.

Figure 2:
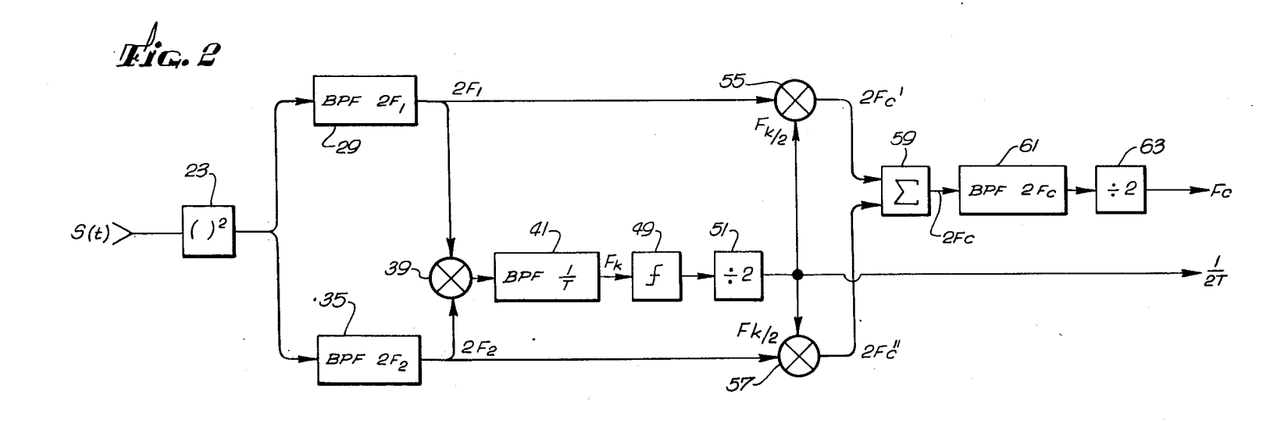
FIG. 2 is a block diagram of an MSK clock and carrier recovery circuit according to the present invention.
Figure 3:
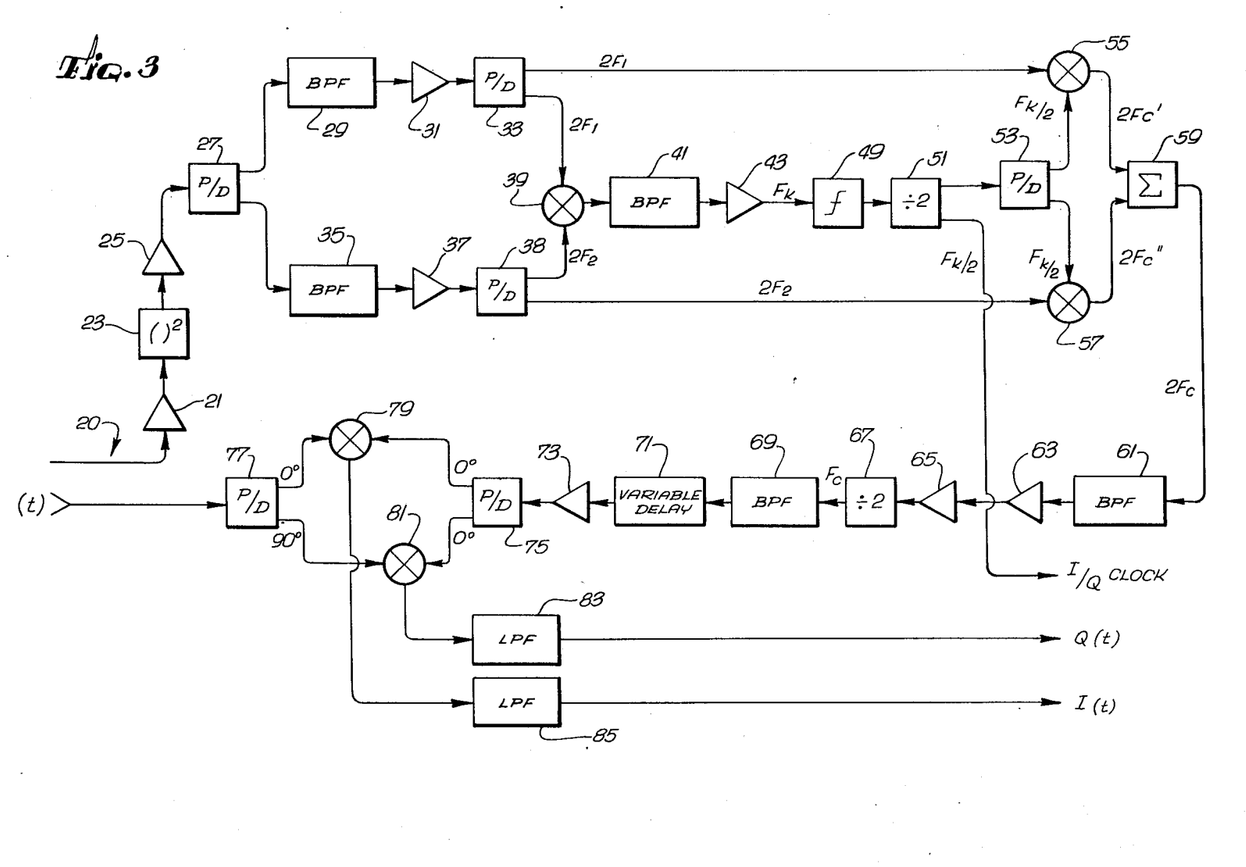
FIG. 3 is a detailed block diagram of an MSK demodulator employing a clock and carrier recovery circuit according to the present invention.

In accordance with the present invention, ringing filters are substituted for the phase-locked loops as shown in the block diagram of FIG. 2. and the more detailed diagram of FIG. 3. Basically, a ringing filter is a resonant cavity that is responsive to a very narrow band of frequencies. Such a filter is said to "ring at" a particular frequency, meaning that the output the filter will be at the ringing frequency, but at an amplitude dependent on the amplitude and duration of the ringing-frequency component at the input of the filter. The numbers of the elements in FIG. 2 correspond with the comparable elements in FIG. 3.

In FIG. 2, an input MSK signal S is applied to squarer 23, doubling the input signal to produce a signal having, at any given moment, a frequency of either $2F_1$ or $2F_2$, just as in the circuit of FIG. 1. Ringing filter 29 rings at $2F_1$, which provides a continuous output signal having frequency $2F_1$ but an amplitude that varies according to when $F_1$ is actually present in S. Likewise, ringing filter 35 rings at $2F_2$ and gives a continuous output signal having frequency $2F_2$ but an amplitude that varies according to when $F_2$ is actually present in S. Unlike the relatively slow phase-locked loops 12 and 13 of FIG. 1, ringing filters 29 and 35 are single-cavity filters which provide minimum step-function response time for a given bandwidth. This is a key requirement for rapid carrier recovery.

A clock signal with frequency $F_k$ is recovered by mixer 39 and a filter 41, just as the clock signal is recovered in the circuit of FIG. 1 by mixer 14 and filter 15. In FIG. 2, a limiter 49 is used to eliminate amplitude modulation introduced by the action of filters 29 and 35. The limiter 49 prevents the amplitude of the clock signal from exceeding a specified value. Frequency $F_k$ is sufficiently low that the limiter 49 does not introduce unacceptable phase modulation distortion into the clock signal.

The clock signal $F_k$ is divided in divider 51 to produce a new signal having frequency $F_k/2$. This new signal is mixed with $2F_1$ in mixer 55 to produce sum and difference signals. The sum signal, $2F_c'$, has frequency $2F_c$ and an amplitude modulation that varies according to when $F_1$ is actually present in S.

The $F_k/2$ signal is mixed with $2F_2$ in mixer 57 to produce sum and difference signals. The difference signal, $2F_c''$, has frequency $2F_c$ and an amplitude modulation that varies according to when $F_2$ is actually present in S.

The amplitude modulation present in $2F_c'$ is complementary to the amplitude modulation present in $2F_c''$. Hence, when these two signals are applied to summer 59, their amplitude modulations cancel, yielding a signal having frequency $2F_c$ and constant amplitude. Bandpass filter 61 removes any other signals introduced by the summer 59, and divider 63 reduces the signal having frequency $2F_c$ to a final recovered carrier at frequency $F_c$.

A preferred embodiment of the present invention is shown in FIG. 3. FIG. 3 is a more detailed diagram than FIG. 2, but each element in FIG. 2 has a corresponding element in FIG. 3, and corresponding elements in the two figures are numbered alike. For example, limiter 49 in FIG. 2 corresponds to limiter 49 in FIG. 3.

In FIG. 3, a directional coupler 20 provides part of input signal S to squarer 23. Squarer 23 doubles the frequencies present in S and, after amplification by amplifier 25, the signal with these doubled frequencies is applied to ringing filters 29 and 35 through power divider 27. The output of filter 29 has a frequency $2F_1$ and is applied to the mixer 39 through an amplifier 31 and a power divider 33. The output of filter 35 has a frequency $2F_2$ and is applied to the mixer 39 through an amplifier 37 and another power divider 38. The mixer 39 produces a signal having a frequency equal to the difference between $2F_2$ and $2F_1$. This difference signal, having frequency $F_k$, is the desired clock signal. The filter 41 removes extraneous frequencies from the output of the mixer 39, and after amplification by amplifier 43, the limiter 49 removes any remaining variations in amplitude of the recovered clock signal $F_k$.

The clock signal $F_k$ is divided by frequency divider 51 to produce a signal having frequency $F_k/2$, and this signal is applied to the mixers 55 and 57 through another power divider 53. The mixer 55 produces the sum and difference of $2F_1$ and $F_k/2$, of which only the sum, having frequency $2F_c$, is desired. The $2F_2$ signal is applied to the mixer 57 through amplifier 56, and the result is the sum and difference of $2F_2$ and $F_k/2$, of which only the difference, having frequency $2F_c$, is desired. The amplitude modulation added to $2F_1$ by the filtering action of filter 29 is complementary to the amplitude modulation added to $2F_2$ by filter 35, and these two amplitude modulation components cancel each other in the summer 59, yielding an output having frequency $2F_c$ and constant amplitude.

The bandpass filter 61 removes the unwanted signals from the output of the summer 59, and after amplification by amplifiers 63 and 65, the frequency $2F_c$ is divided by divider 67 to give a recovered carrier signal having the desired frequency $F_c$.

The recovered carrier $F_c$ is then applied to mixers 79 and 81 through a filter 69, a variable delay 71, an amplifier 73 and another power divider 75. The received signal S is applied to mixer 79 through power divider 77, and the output of the mixer 79 includes the difference between S and $F_c$, which is a signal I(t) carrying half of the original digital data being transmitted. A low pass filter 85 removes the undesired sum output of the mixer 79.

The phase of signal S is also shifted 90 degrees by power divider 77 and is then applied to another mixer 81. The output of the mixer 81 contains the sum and difference of $F_c$ and the phaseshifted S, and the difference signal is a signal Q(t) carrying the other half of the original data being transmitted. A low-pass filter 83 removes the undesired sum output of the mixer 81.

In the preferred embodiment illustrated in FIG. 3, the circuit components have been selected for an input signal S having frequencies $F_1 = 537.5$ MHz and $F_2 = 662.5$ MHz. These two signals correspond to an original transmitter carrier of frequency $F_c = 600$ MHz and a clock of frequency $F_k O = 250$ MHz. The following specific components can be used for operation at these frequencies:

| No. | Designator | Manufacturer | Part No. |
|-----|------------|--------------|----------|
| 20 | Directional Coupler | Anaren | 10014-10 |
| 21 | Amplifier | Avantek | UTC12-104M |
| 23 | Doubler | Vari-L | WD-102 |
| 25 | Amplifier | Aertech | A4676 |
| 27 | Power Divider | Anzac | DS-313 |
| 29 | Cavity Filter: 1,075 MHz | | |
| 31 | Amplifier | Avantek | UT80-0658M |
| 33 | Sigma/Delta Hybrid | Anzac | HH-128 |
| 35 | Cavity Filter: 1,325 MHz | | |
| 37 | Amplifier | Avantek | UT80-0658M |
| 38 | Sigma/Delta Hybrid | Anzac | HH-128 |
| 39 | Mixer | Watkins-Johnson | M1J |
| 41 | Cavity Filter: 250 MHz | | |
| 43 | Amplifier | Avantek | UT80-0673M |
| 49 | Comparator | Plessey | 9685 |
| 51 | Flip-Flop and Line Driver | Fairchild Tau-Tron | 11C06 PM501M |
| 53 | Sigma/Delta Hybrid | Anzac | HH-128 |
| 55 | Mixer | Watkins-Johnson | M1J |
| 57 | Mixer | Watkins-Johnson | M1J |
| 59 | Sigma/Delta Hybrid | Anzac | HH-128 |
| 61 | Cavity Filter: 1,200 MHz | Delta Microwave | |
| 63 | Amplifier | Avantek | UT80-0658M |
| 65 | Amplifier | Watkins-Johnson | 6202-7 |
| 67 | 1000 MHz-2 | Plessey | 8605 |
| 69 | Cavity Filter: 600 MHz | | |
| 71 | Delay Line | | |
| 73 | Amplifier | Avantek | UTC-1033 |
| 75 | Power Divider | Anaren | 4J0264 |
| 77 | 90 degree Hybrid | Anaren | 10014-3 |
| 79 | Mixer | Watkins-Johnson | M1J |
| 81 | Mixer | Watkins-Johnson | M1J |
| 83 | Lumped LC Filter: 250 MHz | | |
| 85 | Lumped LC Filter: 250 MHz | | |

The present invention is key to efficient use of TDMA/MSK communications. Prior to the present invention, it has not been possible to fully utilize MSK transmission at high data rates in TDMA communication systems.

Although one specific embodiment of this invention has been described and illustrated, it will be understood that the invention is not to be limited to the specific forms or arrangements of parts so described and illustrated, and that various changes can be made within the scope of the invention. For example, by proper selection of parts, operation at many different carrier and clock frequencies can be achieved. Operation at other frequencies might obviate the need for some of the components illustrated in FIG. 3 such as power dividers and directional couplers. It is therefore to be understood that, within the scope of the appended claims, the invention may be practiced otherwise than as specifically described.

I claim:

1. A minimum shift keying (MSK) receiver clock and carrier recovery circuit comprising:
    means for doubling the frequency of a received MSK signal;
    a first ringing filter, tuned to a frequency equal to twice the lower of the two tone frequencies present in the MSK signal, having its input connected to the output of the doubling means;
    a second ringing filter, tuned to a frequency equal to twice the higher of the two tone frequencies present in the MSK signal, also having its input connected to the output of the doubling means;
    a first mixer having two inputs, one being connected to the output of the first ringing filter, the other being connected to the output of the second ringing filter, for mixing the output signals of the two ringing filters to produce a new frequency equal to the difference between the frequencies of the output signals of the two ringing filters, said difference frequency being also equal in frequency to the clock frequency of the MSK signal;
    a clock frequency filter tuned to a frequency equal to the clock frequency of the MSK signal, connected to the output of the first mixer, for filtering out all frequencies except the clock frequency;
    a first divide-by-two frequency divider, connected to the output of the clock frequency filter, having an output signal with a frequency equal to one-half the MSK clock frequency;
    a second mixer having two inputs, one of its inputs being connected to the output of the first ringing filter, the other of its inputs being connected to the output of the first divide-by-two frequency divider, for mixing the output signals of those two circuits to produce a new frequency equal to the sum of the frequencies of the output signals of the first ringing filter and the first divide-by-two frequency divider, said sum being also equal in frequency to twice the carrier frequency of the MSK signal;
    a third mixer having two inputs, one of its inputs being connected to the output of the second ringing filter, the other of its inputs being connected to the output of the first divide-by-two frequency divider, for mixing the output signals of those two circuits to produce a new frequency equal to the difference of the frequencies of the output signals of the second ringing filter and the first divide-by-two frequency divider, said difference being also equal in frequency to twice the carrier frequency of the MSK signal;
    summing means, connected to the outputs of the second and third mixers, for summing the amplitudes of the output signals of those two mixers;
    carrier frequency bandpass filter means tuned to a frequency equal to twice the MSK carrier frequency, connected to the output of the summing means; and
    a second divide-by-two frequency divider, connected to the output of the carrier frequency filter means.

2. A clock and carrier recovery circuit according to claim 1, comprising in addition limiting means for reducing amplitude variations in the recovered clock signal, connected in between the clock frequency filter and the first divide-by-two frequency divider.

3. A clock and carrier recovery circuit for recovering a clock signal of frequency $F_k$ and a carrier signal of frequency $F_c$, from a received minimum shift keying ("MSK") signal having, before transmission, a carrier signal of frequency $F_c$, a clock signal of frequency $F_k$, a first modulating tone of frequency $F_1=F_c-F_k/4$, and a second modulating tone of frequency $F_2=F_c+F_k/4$, the clock and carrier recovery circuit comprising:

means for doubling the frequency of the received MSK signal;

a first ringing filter, tuned to a frequency equal to two times $F_1$, having its input connected to the output of the doubling means;

a second ringing filter, tuned to a frequency equal to two times $F_2$, having its input connected to the output of the doubling means;

a first mixer having two inputs, one of its inputs being connected to the output of the first ringing filter, the other of its inputs being connected to the output of the second ringing filter, for mixing the output signals of the two ringing filters to produce a new frequency equal to the difference between two times $F_2$ and two times $F_1$, said difference being equal to clock frequency $F_k$;

a clock bandpass filter tuned to a frequency equal to $F_k$, connected to the output of the first mixer, for filtering out all frequencies except $F_k$;

a first divide-by-two frequency divider, connected to the output of the clock bandpass filter, having an output of frequency equal to one-half the clock frequency $F_k$;

a second mixer having two inputs, one of its inputs being connected to the output of the first ringing filter, the other of its inputs being connected to the output of the first divide-by-two frequency divider, for mixing the output signals of those two circuits to produce a new frequency equal to the sum of the frequencies of the output signals of the first ringing filter and the first divide-by-two frequency divider, said sum being also equal in frequency to two times carrier frequency $F_c$;

a third mixer having two inputs, one of its inputs being connected to the output of the second ringing filter, the other of its inputs being connected to the output of the first divide-by-two frequency divider, for mixing the output signals of those two circuits to produce a new frequency equal to the difference of the frequencies of the output signals of the second ringing filter and the first divide-by-two frequency divider, said difference being also equal in frequency to two times carrier frequency $F_c$;

summing means, connected to the outputs of the second and third mixers, for summing the amplitudes of the output signals of those two mixers;

a carrier bandpass filter tuned to a frequency equal to two times $F_c$, connected to the output of the summing means; and a second divide-by-two frequency divider, connected to the output of the carrier bandpass filter.

4. A clock and carrier recovery circuit according to claim 3, comprising in addition limiting means, connected to the output of the clock bandpass filter, for removing variations in amplitude from the clock frequency signal output of the clock filter.

5. A clock and carrier recovery circuit for a minimum shift keying ("MSK") receiver, for recovering a clock signal having frequency $F_k$, and a carrier signal having frequency $F_c$, from a received minimum shift keying ("MSK") signal having, before transmission, a carrier signal of frequency $F_c$, a clock signal of frequency $F_k$, a first modulating tone of frequency $F_1=F_c-F_k/4$, and a second modulating tone of frequency $F_2=F_c+F_k/4$, the carrier recovery circuit comprising:

a first signal dividing means for dividing the received MSK signal into two signals;

means for doubling the frequency of the received MSK signal, connected to one of the outputs of the first signal dividing means;

a second signal dividing means, connected to the output of the doubling means;

a first ringing filter, tuned to a frequency equal to two times the $F_1$ tone frequency present in the MSK signal, having its input connected to one of the outputs of the second signal dividing means;

a second ringing filter, tuned to a frequency equal to two times the $F_2$ tone frequency present in the MSK signal, having its input connected to the other output of the second signal dividing means;

a third signal dividing means, connected to the output of the first ringing filter;

a fourth signal dividing means, connected to the output of the second ringing filter;

a first mixer having two inputs, one of its inputs being connected to an output of the third signal dividing means, the other of its inputs being connected to an output of the fourth signal dividing means, for mixing the output signals of the two ringing filters to produce a new frequency equal to the difference between the frequencies of the output signals of the two ringing filters, said difference frequency being also equal in frequency to the clock frequency $F_k$ of the MSK signal;

clock filtering means for filtering out all frequencies except the clock frequency, connected to the output of the first mixer;

a first divide-by-two frequency divider, connected to the output of the clock filtering means, having two outputs each of frequency equal to one-half clock frequency $F_k$;

a fifth signal dividing means connected to an output of the first frequency divider;

a second mixer having two inputs, one of its inputs being connected to an output of the fifth signal dividing means, the other of its inputs being connected to the other output of the third signal dividing means, for mixing the output signals of those two circuits to produce a new frequency equal to the sum of the frequencies of the output signals of the first ringing filter and the first divide-by-two frequency divider, said sum being also equal in frequency to two times the carrier frency divider;

a third mixer having two inputs, one of its inputs being connected to the other output of the fifth signal dividing means, the other of its inputs being connected to the other output of the fourth signal dividing means, for mixing the output signals of those two circuits to produce a new frequency equal to the difference of the frequencies of the output signals of the second ringing filter and the first divide-by-two frequency divider, said difference being also equal in frequency to two times the carrier frequency $F_c$ of the MSK signal;

summing means, connected to the outputs of the second and third mixers, for summing the amplitudes of the output signals of those two mixers;

a carrier bandpass filter tuned to a frequency equal to twice the MSK carrier frequency $F_c$, connected to the output of the summing means; and a second divide-by-two frequency divider, connected to the output of the carrier band pass filter.

6. A clock and carrier recovery circuit according to claim 5, wherein the clock filtering means comprises:

a clock bandpass filter tuned to a frequency equal to the clock frequency $F_k$, connected to the output of the first mixer, for filtering out all frequencies except the clock frequency;

limiting means, connected to the output of the bandpass filter, for removing variations in amplitude from the clock frequency signal.

7. A clock and carrier recovery circuit according to claim 3, comprising in addition an $F_c$ bandpass filter, tuned to a frequency equal to carrier frequency $F_c$, connected to the output of the second divide-by-two frequency divider.

8. A minimum shift keying ("MSK") demodulator for an MSK receiver, for demodulating a received MSK signal having, before transmission, a carrier signal of frequency $F_c$ and phase P, a clock signal of frequency $F_k$, a first modulating tone of frequency $F_1 = F_c - F_k/4$, and a second modulating tone of frequency $F_2 = F_c + F_k/4$, $F_1$ and $F_2$ being used to modulate the $F_c$ carrier signal with an I channel signal I(t) and a Q channel signal Q(t), the demodulator comprising:

a first coupler for dividing the received MSK signal into two signals;

a first amplifier means connected to one of the outputs of the first coupler;

a squaring circuit for doubling the frequency of the received MSK signal, connected to the output of the first amplifier means;

a second amplifier means connected to the output of the squaring circuit;

a first power divider connected to the output of the second amplifier means;

a first ringing filter, tuned to a frequency equal to two times the $F_1$ tone frequency present in the MSK signal, having its input connected to one of the outputs of the first power divider;

a second ringing filter, tuned to a frequency equal to two times the $F_2$ tone frequency present in the MSK signal, having its input connected to the other output of the first power divider;

a third amplifier means connected to the output of the first ringing filter;

a second power divider, connected to the output of the third amplifier means;

a fourth amplifier means connected to the output of the second ringing filter a third power divider, connected to the output of the second ringing filter;

a first mixer having two inputs, one of its inputs being connected to an output of the second power divider, the other of its inputs being connected to an output of the third power divider, for mixing the output signals of the two ringing filters to produce a new frequency equal to the difference between the frequencies of the output signals of the two ringing filters, said difference frequency being also equal in frequency to the clock frequency $F_k$ of the MSK signal;

a clock bandpass filter tuned to a frequency equal to the clock frequency $F_k$, connected to the output of the first mixer, for filtering out all frequencies except the clock frequency;

a fifth amplifier means connected to the output of the clock bandpass filter;

limiting means, connected to the output of the fourth amplifier means, for removing variations in amplitude from the clock frequency signal;

a first divide-by-two frequency divider, connected to the output of the limiting means, having two outputs each of frequency equal to one-half clock frequency $F_k$;

a fourth power divider connected to an output of the first frequency divider;

a second mixer having two inputs, one of its inputs being connected to an output of the fourth power divider, the other of its inputs being connected to the other output of the second power divider, for mixing the output signals of those two circuits to produce a new frequency equal to the sum of the frequencies of the output signals of the first ringing filter and the first frequency divider, said sum being also equal in frequency to two times the carrier frequency $F_c$ of the MSK signal;

a third mixer having two inputs, one of its inputs being connected to the other output of the fourth power divider, the other of its inputs being connected to the other output of the third power divider, for mixing the output signals of those two circuits to produce a new frequency equal to the difference of the frequencies of the output signals of the second ringing filter and the first frequency divider, said difference being also equal in frequency to two times the carrier frequency $F_c$ of the MSK signal;

summing means, connected to the outputs of the second and third mixers, for summing the amplitudes of the output signals of those two mixers;

a carrier bandpass filter tuned to a frequency equal to twice the MSK carrier frequency $F_c$, connected to the output of the summing means;

a sixth and seventh amplifier means connected to the output of the carrier bandpass filter;

a second divide-by-two frequency divider, connected to the output of the carrier band pass filter;

an $F_c$ bandpass filter, tuned to a frequency equal to carrier frequency $F_c$, connected to the output of the second frequency divider;

an eighth amplifier means connected to the output of the $F_c$ bandpass filter;

a fifth power divider connected to the output of the eighth amplifier means;

a phase-shifting power divider connected to the other output of the first coupler and having a first output signal with the same phase as the input and a second output signal with a 90 degree phase shift relative to the input;

a fourth mixer having two inputs, one input being connected to the first output from the phase-shifting power divider and the other input being connected to an output from the fourth power divider, for mixing the received MSK signal with the recovered carrier $F_c$ to produce the I(t) signal;

an I-signal low pass filter, connected to the output of the fourth mixer, to filter out all frequencies except I(t);

a fifth mixer having two inputs, one input being connected to the second output from the phase-shifting power divider and the other input being connected to the other output from the fourth power divider, for mixing the received MSK signal as phase-shifted by the phase-shifting power divider with the recovered carrier $F_c$ to produce the Q(t) signal; and a Q-signal low pass filter, connected to the output of the fifth mixer, to filter out all frequencies except Q(t).

9. For use in a minimum shift keying (MSK) receiver system, a circuit for recovering clock and carrier signals from a received signal containing two frequency tones $F_1$ and $F_2$, said circuit comprising:

means for doubling the frequency of the received signal;

dual means for filtering the frequency-doubled signal, to yield first and second continuous signals at frequencies of $2F_1$ and $2F_2$, respectively;

means for deriving a half-clock-frequency signal from the first and second continuous signals;

means for mixing the first and second continuous signals with the half-clock-frequency signal, to yield two composite signals containing a component at twice the carrier frequency;

means for summing the two composite signals to eliminate complementary amplitude modulations;

means for filtering the signal resulting from said summing means, to obtain a signal of constant amplitude and at twice the carrier frequency; and means for halving the frequency of the signal resulting from said last-mentioned filtering means, to recover the carrier signal.

10. A circuit as set forth in claim 9, wherein said means for deriving the half-clock-frequency includes:

means for mixing the first and second continuous signals with each other;

means for filtering the signals resulting from the last-mentioned means for mixing, to obtain a difference component at the clock frequency;

means for limiting the magnitude of the difference component signal to eliminate amplitude variations; and means for halving the frequency of the clock-frequency signal to obtain the half-clock-frequency signal.

11. For use in a minimum shift keying (MSK) receiver system, a circuit for recovering clock and carrier signals from a received signal containing two frequency tones $F_1$ and $F_2$, said circuit comprising:

means for doubling the frequency of the received signal;

first and second ringing filter means coupled to the means for doubling the frequency of the received signal, and tuned to frequencies $2F_1$ and $2F_2$, respectively, to provide first and second continuous signals at frequencies $2F_1$ and $2F_2$, but amplitude-modulated in complementary senses in accordance with data signals encoded on the received signal; and means for recovering a carrier signal from the first and second continuous signals, the recovered carrier signal being free of amplitude modulation, and wherein said means for recovering a carrier signal includes means for deriving a clock signal from the first and second continuous signals, means for mixing the clock signal with the first and second continuous signals, to obtain intermediate signals at twice the carrier frequency, and means for summing the intermediate signals to eliminate amplitude modulation.

12. For use in a minimum shift keying (MSK) receiver system, a method for recovering clock and carrier signals from a received signal containing two frequency tones $F_1$ and $F_2$, said method comprising the steps of:

doubling the frequency of the received signal;

applying the frequency-doubled signal to first and second ringing filters tuned to frequencies $2F_1$ and $2F_2$, respectively, to yield first and second continuous signals at frequencies $2F_1$ and $2F_2$, but amplitude modulated in complementary senses in accordance with data signals encoded on the received signal; and recovering a carrier signal from the first and second continuous signals, the recovered carrier signal being free of amplitude modulation, and wherein said recovering step includes deriving a clock signal from the first and second continuous signals, mixing the clock signal with the first and second continuous signals, to obtain intermediate signals at twice the carrier frequency, and summing the intermediate signals to eliminate amplitude modulation.

13. For use in a minimum shift keying (MSK) receiver, a method for recovering clock and carrier signals from a received signal containing two frequency tones $F_1$ and $F_2$, said method comprising the steps of:

doubling the frequency of the received signal;

applying the frequency-doubled signal to first and second ringing filters tuned to frequencies $2F_1$ and $2F_2$, respectively, to yield first and second continuous signals at these frequencies;

deriving a half-clock-frequency signal from the first and second continuous signals;

mixing the first and second continuous signals with the half-clock-frequency signal, to yield two composite signals containing a component at twice the carrier frequency;

summing the two composite signals to eliminate complementary amplitude modulations;

filtering the signal resulting from said summing step, to obtain a signal of constant amplitude and at twice the carrier frequency; and frequency-dividing the signal resulting from said last-mentioned filtering step, to recover the carrier signal.

14. A method as set forth in claim 13, wherein said step of deriving the half-clock frequency signal includes:

mixing the two first and second continuous signals with each other;

filtering the signals resulting from the last-mentioned mixing step to obtain a difference component at the clock frequency;

limiting the difference component signal to eliminate amplitude variations; and frequency-dividing the clock-frequency signal to obtain the half-clock-frequency signal.

15. For use in a minimum shift keying (MSK) receiver system, a circuit for recovering clock and carrier signals from a received signal containing two frequency tones $F_1$ and $F_2$, said circuit comprising:

means for doubling the frequency of the received signal;

first and second ringing filter means coupled to the means for doubling the frequency of the received signal, and tuned to frequencies $2F_1$ and $2F_2$, respectively, to provide first and second continuous signals at frequencies $2F_1$ and $2F_2$, but amplitude-modulated in complementary senses in accordance with data signals encoded on the received signal; and means for recovering a carrier signal from the first and second continuous signals, the recovered carrier signal being free of amplitude modulation, and wherein the means for recovering the carrier signals includes means for deriving a half-clock-frequency signal from the first and second signals, means for mixing the half-clock-frequency signal with the first and second signals, to obtain twice-carrier frequency components that are amplitude-modulated in complementary senses, summing means for eliminating the amplitude modulation from signals resulting from the last-mentioned means for mixing, filter means for eliminating frequency components other than the twice-carrier frequency component, and frequency halving means, for deriving a carrier frequency signal from the twice-carrier frequency component.

16. For use in a minimum shift keying (MSK) receiver system, a method for recovering clock and carrier signals from a received signal containing two frequency tones $F_1$ and $F_2$, said method comprising the steps of:

doubling the frequency of the received signal;

applying the frequency-doubled signal to first and second ringing filters tuned to frequencies $2F_1$ and $2F_2$, respectively, to yield first and second continuous signals at frequencies $2F_1$ and $2F_2$, but amplitude modulated in complementary senses in accordance with data signals encoded on the received signal; and recovering a carrier signal from the first and second continuous signals, the recovered carrier signal being free of amplitude modulation, wherein said step of recovering a carrier signal includes deriving a half-clock-frequency signal from the first and second continuous signals, mixing the half-clock-frequency signal with the first and second continuous signals, to obtain twice-carrier-frequency components that are amplitude-modulated in complementary senses, eliminating the amplitude modulation from signals resulting from the last-mentioned mixing step, eliminating frequency components other that the twice-carrier-frequency components, and deriving a carrier-frequency signal from the twice-carrier-frequency components.

* * * * *